UNITED STATES PATENT OFFICE 2,056,448

PROCESS FOR THE SEPARATION OF CHLOR-HYDRINS FROM HYDROCHLORIC ACID SOLUTIONS

Paul Ferrero, Tertre, and Corneille Vandendries, Baudour, Belgium, assignors to Societe Carbochimique, Société Anonyme, Brussels, Belgium, a Belgian company No Drawing. Application December 23, 1935, Serial No. 55,926. In France December 26, 1934

5 Claims. (Cl. 260—157)

It is known that in order to prepare chlorhydrins such as the ethylenic chlorhydrin, the propylenic chlorhydrin etc. it suffices to add a molecule of hypochlorous acid to a molecule of the corresponding olefine hydrocarbon. This reaction, which is carried out in aqueous solution, is represented for example in the case of ethylene by the equation:

$$C_2H_4 + HOCl = C_2H_5OCl$$

The hypochlorous acid required for this addition may be obtained in different ways, but it is usually produced either from hypochlorites the acid component of which is freed by carbonic acid or by chlorine, or from chlorine and water. Whatever be the method of production, it is found that for each molecule of hypochlorous acid obtained, a molecule of hydrochloric acid is formed:

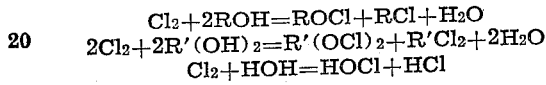
$$Cl_2 + 2ROH = ROCl + RCl + H_2O$$
$$2Cl_2 + 2R'(OH)_2 = R'(OCl)_2 + R'Cl_2 + 2H_2O$$
$$Cl_2 + HOH = HOCl + HCl$$

R being an alkaline radical and R' an alkaline earthy radical.

Whereas by the method starting from hypochlorite, the hydrochloric acid is converted into alkaline chloride or alkaline earthy chloride before hypochlorous acid is freed, so that said hydrochloric acid may be considered as wasted since said salts are of no value,—by the direct method starting from chlorine and water the hydrochloric acid formed together with the hypochlorous acid remains as such in the solution. The hypochlorous acid uniting with the olefine, the solution gets richer, in this case in equimolecular amounts, in chlorhydrin and in hydrochloric acid, and there is finally obtained a hydrochloric solution with 5–10% of chlorhydrin.

This solution may be used in different ways:

The chlorhydrin may for example be converted directly into the corresponding glycol by the action, at elevated temperature, of a weak alkali such as $NaHCO_3$, $Na_2CO_3$, $CaCO_3$, or into alkylene oxide by the action of a strong alkali such as NaOH or $Ca(OH)_2$, which process however, like the first mentioned method, entails the loss of the HCl present and consumes, without profit, a supplemental molecule of the alkaline agent.

The chlorhydrin, on the other hand, may also be separated by distillation, the hydrochloric acid then remaining in the residue being available for any desired use, but such distillation with a solution steadily increasing in acidity necessitates the use of apparatus both costly and delicate.

The enrichment in chlorhydrins may be promoted if distillation is performed after the initial solution has been saturated with a salt such as $CaCl_2$ or NaCl, the first of these having proved to be the more efficient according to Gomberg, Journal American Chem. Soc. vol. 41, p. 1424 (1919). Here again the hydrochloric acid is lost.

As to neutralizing the solution before distillation, as has also been proposed, by the action of a base or of an alkaline or alkaline earthy salt, this wastes not only the hydrochloric acid, but also the base.

The present invention has for its object to provide a process for the separation of chlorhydrins obtained from olefines, chlorine and water, which process will permit of converting the hydrochloric acid into a useful by-product, thereby favourably influencing the economy of the process. It is based on observation of the fact that it is possible directly to neutralize the HCl of hydrochloric solutions of chlorhydrins and form ammonium chloride, without producing undesirable organic compounds at the expense of the chlorhydrin.

The process according to this invention consists broadly in directly neutralizing the hydrochloric solution of chlorhydrin by ammonia or ammonium salts of weak acids adapted to be expelled in gaseous form from the reagents, then in distilling the chlorhydrin which can be subsequently used at will in any known way.

If it be desired to obtain more concentrated solutions of chlorhydrin, the solution may be saturated with ammonium chloride after it has been neutralized with ammonia and before it is subjected to distillation.

The present process combines the advantages of the various processes proposed heretofore and it permits, under equal conditions of yield and purity, to prepare chlorhydrin solutions adapted for any desired subsequent use.

Its chief advantage, however, is to permit of recovering in a useful form ($NH_4Cl$) 50% of the chlorine used, which result is obtained neither with the direct hydrolysis in presence of caustic soda, lime or salts of alkaline or alkaline earthy metals, nor with the neutralization, before distillation, with caustic soda, or lime or salts of alkaline or alkaline earth metals.

We give below a characteristic example of applying the invention and of carrying out the process in a particular case:

Example

To 100 litres of a 6,6% chlorhydrin solution containing about 3 kgs. of HCl, we add about 1,4 kg. of $NH_3$ which may be in gaseous form or in the form of an aqueous solution. The solution then is boiled. After having distilled about 70% of the total volume, there is obtained 97,5% of the initial chlorhydrin in the form of a 9,2% solution.

It is of course understood that the process according to the invention is not in any way limited to the above example, and that it subsists whatever be the operating conditions, the proportions of the reagents and the form in which the ammonia is introduced.

The distillation of a chlorhydrin solution is always accompanied by a slight hydrolysis which causes a weak acidification of the solution, but it is easily feasible, without acting on the chlorhydrin, to keep the solution neutral during the entire operation by a supplementary addition of ammonia.

As to the recovery of the ammonium chloride from the residue of distillation, it can be carried out in several ways:

If we proceed, for example, to fractional crystallization, we can obtain, in the first crystals formed, the greater part of the salt in a state of great purity, the mother liquor being, for example, taken back with the residue of a subsequent distillation, this being repeated until a given concentration in impurities is obtained; after this stage, we may evaporate to dryness and then treat the impure salt in order to free it from its impurities, i. e. organic impurities originating from the slight hydrolysis above referred to, this treatment being effected either with a solvent (such as alcohol) for these impurities, or more simply by suitably heating the salt, which thermal treatment renders the impurities insoluble and permits the recrystallization of pure salt.

We claim:

1. In a process of separating chlorhydrins from hydrochloric acid solutions thereof, causing an olefine to react with chlorine and water to produce chlorhydrin and hydrochloric acid, neutralizing said hydrochloric acid by conversion thereof into ammonium chloride, distilling the chlorhydrin and collecting same.

2. In a process of separating chlorhydrins from hydrochloric acid solutions thereof, causing an olefine to react with chlorine and water to produce chlorhydrin and hydrochloric acid, neutralizing said hydrochloric acid with ammonia, distilling the chlorhydrin and collecting same.

3. In a process of separating chlorhydrins from hydrochloric acid solutions thereof, causing an olefine to react with chlorine and water to produce chlorhydrin and hydrochloric acid, neutralizing said hydrochloric acid with the ammonium salt of a weak acid adapted to be expelled in gaseous form, distilling the chlorhydrin and collecting same.

4. In a proces of separating chlorhydrins from a hydrochloric acid solution thereof, neutralizing the hydrochloric acid in said solution by conversion thereof into ammonium chloride, saturating the solution with ammonium chloride, distilling the chlorhydrin and recovering same, crystallizing and collecting the ammonium chloride.

5. In a process of separating chlorhydrins from a hydrochloric acid solution thereof, treating said solution with ammonia to neutralize the hydrochloric acid present by conversion thereof into ammonium chloride, distilling the chlorhydrin, keeping the solution neutral during the distilling operation by an addition of ammonia, collecting the chlorhydrin, crystallizing the ammonium chloride, purifying and collecting same.

PAUL FERRERO.
CORNEILLE VANDENDRIES.